United States Patent Office 3,556,686
Patented Jan. 19, 1971

3,556,686
PNEUMATIC PULSATOR
Palle-Finn Beer, Lidingo, Sweden, assignor to AB Autokemi, Stockholm, Sweden, a corporation of Sweden
Filed Oct. 16, 1968, Ser. No. 768,113
Claims priority, application Sweden, Nov. 24, 1967, 16,184/67
Int. Cl. F04b 9/10; F15b 7/00; F16k 31/08
U.S. Cl. 417—383
12 Claims

ABSTRACT OF THE DISCLOSURE

A pneumatic pulsator in which inlet and outlet passages are arranged to be placed in direct fluid communication with each other. A valve member opens and closes the outlet passage, and is moved by a resilient member which in turn moves in response to the pressure in a regulating chamber, which regulating chamber is in fluid communication with the inlet pasage. Snap action of the valve member may be provided by magnetic means. The inlet may also be pneumatic coupled to another pneumatic device.

BACKGROUND

This invention relates to pneumatic pulsators, and in particular it relates to a new and improved construction of a pneumatic pulsator.

Known pulsators normally include a regulating chamber having a pressure responsive membrane located therein, this chamber being in fluid communication with both the inlet and the outlet passages of the device. In operation, the pressurized fluid entering the inlet passes into the regulating chamber to cause movement of the membrane in one direction, after which the said gas is vented from the regulating chamber through the outlet chamber thereby causing or permitting the membrane to move in the opposite direction.

However, these known pulsators have several disadvantages tending to reduce their suitability for driving various pneumatic and mechanical devices. One such drawback is the difficulty of controlling the frequency of operation of the pneumatic pulsator. Furthermore, known pulsators are bulky and heavy.

Thus, there exists a need for a new and improved pneumatic pulsator in which the frequency of operation can be controlled and which is relatively compact.

SUMMARY OF THE INVENTION

Thus, it is a purpose of this invention to provide a new and improved pneumatic pulsator device which overcomes disadvantages of pneumatic pulsator devices known heretofore.

This purpose is achieved according to the present invention by providing a pulsator with a direct connection between the inlet passage and the outlet passage and by arranging the valve member for movement between a first operating position and a second operating position. In the first operating position the valve member closes the outlet pasage thereby permitting excess pressure to be built up in the regulating chamber. This excess pressure then causes the valve member to move to a second operating position whereat it places the inlet and outlet passages into fluid communication with each other. During this time a subpressure is created in the regulating chamber owing to the ejector effect of the gases flowing from the inlet to the outlet. This in turn causes the valve member to move back to the said first operating position.

The pulsator according to the invention can be used in several applications and can control mechanical, electrical pneumatic and hydraulic devices. The valve member can be prolonged in either direction for mechanical coupling to such a device. Alternatively the pulsator may be provided with an extension of the cylinders containing the valve member for pneumatic coupling to one or more devices. Obviously, both these arrangements can be combined in one pulsator.

A particularly suitable application for the pulsator of the invention is for driving one or more membrane pumps for moving liquids or gases of a chemically aggressive type. In such a device difficulties are encountered in that the parts entering into contact with the aggressive media must be made of a particularly chemically resistant material. However, such materials have the disadvantage of having poor mechanical properties. However, in a membrane pump driven by the pulsator according to the present invention, it is possible to select a good chemically resistant material without having to consider its mechanical properties.

Further advantages are that the whole arrangement comprising the pulsator and the pump is easy to handle and can be built with small dimensions and that it is easily adjustable to operate at different frequencies.

A membrane material which is suitable for pumps of this type is polytetrafluoroethylene, which is under the trademark of "Teflon." This material has the superior resistivity to chemicals and solvents and has exceedingly good bending strength, but otherwise its mechanical properties are poor. When used according to the invention as a membrane in a pump for moving various media and when driven by a gas without being mechanically contacted its useful life is extremely long.

Thus, it is an object of this invention to provide a new and improved pneumatic pulsator.

It is another object of this invention to provide a new and improved pneumatic pulsator which is relatively compact and easy to handle.

It is another object of this invention to provide a pneumatic pulsator, the operating frequency of which may be varied.

It is still another object of this invention to provide a new and improved pneumatic pulsator which may be pneumatically coupled to a pump having a resilient membrane having high chemical resistance notwithstanding the mechanical properties of the membrane.

Other objects and the attendant advantages of the present invention will become apparent from the detailed description to follow together with the accompanying drawings.

BRIEF DESCRIPTION OF THE DRAWINGS

There follows a detailed description of the preferred embodiment to be read together with the accompanying drawings. However, it is to be understood that the detailed description and the drawings are intended to only illustrate a preferred embodiment of the invention and that the invention is capable of numerous modifications and variations apparent to those skilled in the art.

DETAILED DESCRIPTION OF THE PREFERRED EMBODIMENT

Figure 1:
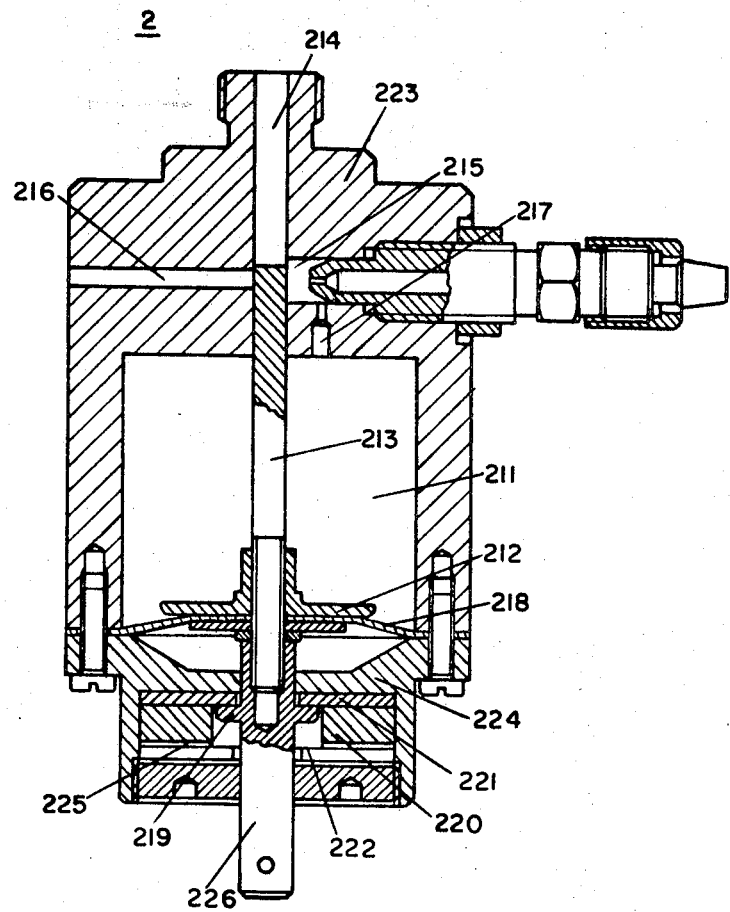
FIG. 1 shows a sectional view through a pneumatic pulsator constructed in accordance with the present invention.

Referring to the drawings, like numerals are used to indicate like elements throughout.

FIG. 1 shows a preferred embodiment of the pneumatic pulsator 2 according to the invention. The pulsator comprises a regulating chamber 211, in which a regulating member 212 is movable by snap action in a manner to be described below. The member 212 is provided with a piston 213 which slides in a cylinder 214. In communication with the cylinder 214 there is provided an inlet passage 215 for compressed gas and opposite thereto and outlet passage 216 of smaller diameter. The movement of the piston 213 is chosen so as to make it possible for the piston to shut off the outlet passage 216 but leave open the inlet passage 215. Furthermore, a shunt passage 217 is provided to connect the chamber 211 with the inlet passage 215.

The regulating member 212 is attached to the wall of the chamber 211 via a membrane 218 and carries an armature 219 cooperating with an annular magnet 220 having a pair of annular shoulder surfaces 221 and 222. The pulsator housing is formed of two portions 223 and 224, one of which comprises the passages 214 and 217 and the other of which comprises the magnet 220 and which is formed into a lid for covering chamber 211. The outlet passage 216 can preferably have an outwardgoing flare. The armature 219 carries an extension 226 for mechanical coupling to an actuating means such as electric contact means or the like.

The regulating member 212 has attached thereto an armature 219 having an annular flange formed thereon. An annular magnet 220 surrounds this armature and has formed thereon a pair of shoulder members 221 and 222 arranged to cooperate with the annular flange on the armature 219. This arrangmeent of magnetic means causes the armature, and hence also the regulating member 212 and the piston 213 to move by a "snap action." That is, once the pressure conditions within the chamber 211 cause the armature 219 to be separated from the shoulder with which it is engaged, the movement will continue until abruptly haulted by engagement of the annular flange on the armature 219 with the opposite shoulder.

Figure 2:
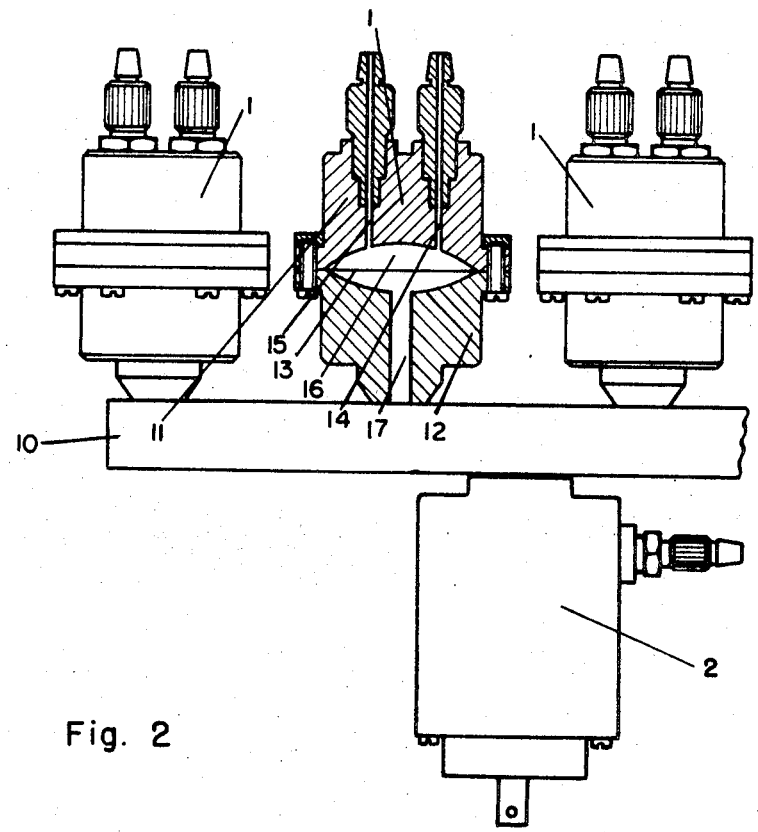
FIG. 2 shows a number of membrane pumps driven by a pneumatic pulsator.

Referring now to FIG. 2, a plurality of membrane pumps 1 can be driven through a manifold 10 advantageously by a single pneumatic pulsator 2. This arrangement is particularly useful for automatic analysers, which are becoming increasingly widespread in the medical field, as well as in other applications such as in chemistry.

The intermediate membrane pump 1 in FIG. 2 is shown in section. It comprises a housing having two halves 11 and 12, between which a membrane 13 is fitted. Provided in one half 11 are inlets and outlets 14 and 15 for the fluid medium to be moved, and which connect to one portion of a chamber 16 which is partitioned into two separate parts by the membrane 13. In the other half 12 of the housing there is provided a regulating passage 17 for compressed gas, the passage 17 communicating with the other part of the chamber 16 and with the cylinder of the pneumatic pulsator 2 through the manifold 10.

The combination pulsator and pump operate as follows: The medium to be moved is drawn in through the inlet 14 of the membrane pump 1 and is ejected through the outlet 15 owing to reciprocating movement of the membrane 13 caused by the pneumatic pulsator 2, this movement being regulated by the compressed gas which is supplied through an inlet passage 215. In the position of the piston 213 shown in FIG. 1, the outlet passage 216 is closed, so that the pressure gas is fed via passage 214 to the membrane pump 1 to act on the membrane 13 causing a pressure to act on the medium above membrane 13. The pressure also acts via the passage 217 in the regulating chamber 211. When a predetermined pressure is reached in the chamber 211, such that the pressure therein exceeds the attraction of the magnet 221 on the armature 219, the regulating member 212 snaps into the other position whereat the flange on armature 219 engages shoulder 222. The piston 213 is moved to uncover the outlet passage 216 and the pressure gas flows out, causing the gas in chamber 211 to flow out through 217, 215 and 216 by the ejector effect. The gas is thus drawn away from the chamber into passage 214 and this causes the fluid medium above membrane 13 to be drawn in. The gas which is drawn off from the regulating chamber 211 causes a subpressure therein. When this subpressure has reached a predetermined value, i.e. when the force of the subpressure exceeds the attraction of the magnet shoulder 222 on the armature 219, the regulating member 212 snaps back into its first position. The piston 213 then again closes the outlet passage 216 and the operating cycle starts again.

The force acting on the membrane 218 when an overpressure acts in the chamber 211 is approximately 4 kp. depending on the pressure at which gas is supplied, whereas the force derived from the subpressure owing to the ejector effect is only about 0.3 kp. To provide a suitable counterforce from the magnet 221, it is proportioned for the higher force, but the interposed inserts 225 of suitable material also provide for a suitable counterforce for the lower value of force on the membrane 218 when a subpressure is present in the chamber 211.

If a variable constriction is placed in the shunt passage 217 connecting the chamber 211 with the inlet 215, it is possible to adjust the operating frequency of the pulsator within a wide range. The invention is also capable of other modifications and variations within the scope of the invention. For instance, the membrane 218 can be replaced by a closed pressure chamber of the type used in conventional barometers. The membrane 13 can be made of other plastics or other materials suitable for membranes.

I claim:

1. A pneumatic pulsator comprising a housing having an inlet passage and an outlet passage arranged to be placed into fluid communication with each other, a valve member movable at least between a first position to close the outlet passage and a second position to open the outlet passage and thereby place it into fluid communication with the inlet passage, a regulating chamber in fluid communication with the inlet passage, control means movable in response to the pressure in the regulator chamber, said valve member being operatively connected to the control means for movement therewith between said first and second positions, whereby when the valve member is in the first position the pressure in the regulating chamber increases causing the control means to move the valve member to the second position, and whereby when the valve member is in the second position a subpressure is created in the regulating chamber by the ejector effect of gases flowing from the inlet passage to the outlet passage causing the control means to move the valve member to the first position, and including a cylinder in said housing open to both the inlet passage and the outlet passage, whereby said inlet and outlet passages are arranged to be placed into fluid communication with each other via said cylinder, said valve member being a piston slidable in said cylinder to close and open the outlet passage in said first and second positions respectively.

2. A pneumatic pulsator according to claim 1 including a shunt passage having a constriction therein for providing said fluid communication between said inlet passage and said regulating chamber.

3. A pneumatic pulsator according to claim 1 including magnetic means operatively associated with the valve member for magnetically holding the valve member in each of the said first and second positions whereby the valve member is movable by snap action between said first and second positions.

4. A pneumatic pulsator according to claim 3 wherein said control means is a resilient membrane extending across said regulating chamber, said valve member being connected to the central portion of said resilient member.

5. A pneumatic pulsator according to claim 4 wherein the housing is formed in two portions which are separated by said membrane, one portion having the inlet and outlet passage formed therein and the other portion having the magnet located therein, said other portion being in the form of a lid.

6. A pneumatic pulsator according to claim 4 wherein said armature extends beyond the magnetic means, on the side of the membrane away from the valve piston and the said cylinder for mechanical coupling with an external actuating means.

7. A pneumatic pulsator according to claim 4 wherein said magnetic means comprises an armature operatively connected to the membrane for movement therewith and an annular magnet surrounding the armature, said magnet having a pair of shoulder portions spaced apart in the direction of movement of the armature and positioned to be contacted by the armature, whereby the armature is magnetically attracted to one of said shoulders in the first position of the value member and magnetically attracted to the other shoulder in the second position of the valve member.

8. A pneumatic pulsator according to claim 7 wherein said magnetic means comprises an armature operatively connected to the membrane for movement therewith and an annular magnet surrounding the armature, said magnet having a pair of shoulder portions spaced apart in the direction of movement of the armature and positioned to be contacted by the armature, whereby the armature is magnetically attracted to one of said shoulders in the first position of the valve member and magnetically attracted to the other shoulder in the second position.

9. A pneumatic pulsator according to claim 1 wherein said cylinder has an extension communicating with the outside of the housing for pneumatic coupling to another pneumatic means, the said piston being arranged in the cylinder such that in its first position when it closes the outlet, it maintains fluid communication between the said extension and the said inlet passage.

10. A pneumatic pulsator according to claim 9 including at least one membrane type pump having a fluid flow chamber and a control chamber, said control chamber being in fluid communication with the said extension of the cylinder, whereby the pump is operated by operation of the pneumatic pulsator.

11. A pneumatic pulsator according to claim 10 wherein the said pump comprises a pair of housing portions separated by said membrane, said membrane being made of polytetrafluoroethylene.

12. A pneumatic pulsator comprising a housing having an inlet passage and an outlet passage arranged to be placed into fluid communication with each other, a valve member movable at least between a first position to close the outlet passage and a second position to open the outlet passage and thereby place it into fluid communication with the inlet passage, a regulating chamber in fluid communication with the inlet passage, control means movable in response to the pressure in the regulator chamber, said valve member being mechanically connected to the control means for movement therewith between said first and second positions, and snap means for causing the said control means to move by snap action between said first and second positions whereby when the valve member is in the first position the pressure in the regulating chamber increases causing the control means to move the valve member to the second position, and whereby when the valve member is in the second position a subpressure is created in the regulating chamber by the ejector effect of gases flowing from the inlet passage to the outlet passage causing the control means to move the valve member to the first position, said snap means including a first magnet arranged to hold the control means in the first position, and a second magnet arranged to hold the control means in the second position, the magnets being spaced apart from cooperating parts of the control means such that when a force is exerted on the control means of sufficient magnitude to separate it from one of the magnets, the control means snaps abruptly throughout its movement to and until halted by engagement with the other magnets.

References Cited

UNITED STATES PATENTS

| | | | |
|---|---|---|---|
| 2,141,427 | 12/1938 | Bryant | 103—235 |
| 2,376,348 | 5/1945 | Fox | 103—235X |
| 2,400,651 | 5/1946 | Marsh | 103—235 |

ROBERT M. WALKER, Primary Examiner

U.S. Cl. X.R.

251—65; 60—62.5